Apr. 17, 1923.
F. ANDRASKA
TIRE CHAIN
Filed March 11, 1921
1,452,405
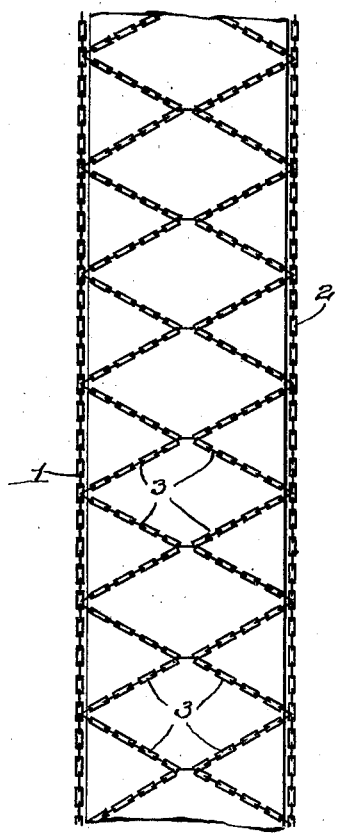
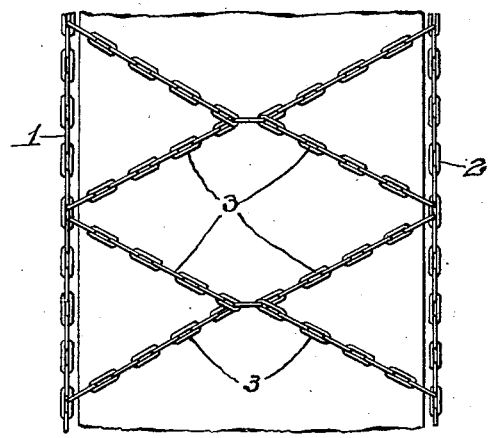
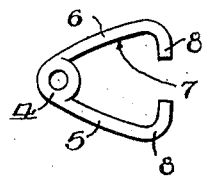
Frank Andraska
INVENTOR
BY Victor J. Evans
ATTORNEY Patented Apr. 17, 1923.

1,452,405

UNITED STATES PATENT OFFICE.

FRANK ANDRASKA, OF MARSHFIELD, WISCONSIN.

TIRE CHAIN.

Application filed March 11, 1921. Serial No. 451,558.

*To all whom it may concern:*

Be it known that I, FRANK ANDRASKA, a citizen of the United States, residing at Marshfield, in the county of Wood and State of Wisconsin, have invented new and useful Improvements in Tire Chains, of which the following is a specification.

This invention relates to anti-skid chains designed to be mounted about pneumatic or cushion tires of vehicle wheels, to prevent skidding of the wheels when the vehicle upon which they are mounted is traveling over slick surfaces and an object of the invention is to provide a chain structure as specified which is comparatively simple in construction and provides chain lengths extending diagonally across the line of travel of the wheel upon which they are mounted to prevent both circumferential and transverse skidding action of the vehicle wheels.

Another object of this invention is to provide a novel form of connecting links in the chain structure which links are simple in construction and will permit quick and easy connection or disconnection of the ends of the chain, maintaining them in connection and against accidental disconnection during operation.

Other objects of the invention will appear in the following detailed description and in the accompanying drawings, wherein:

Fig. 1 is a fragmentary view of a vehicle tire showing the improved chain mounted thereon.

Fig. 2 is an enlarged detail view of the chain structure.

Fig. 3 is an enlarged view of a connecting link used in the chain structure and showing the link in open position.

Fig. 4 is an edge elevation of the connecting link in closed position.

Referring more particularly to the drawing the improved tire chain comprises side chains 1 and 2 which are adapted to engage about the side portions of a vehicle wheel tire and which are composed of ordinary oval shaped links preventing the provision of sharpened ends or edges which might cut or gouge into the tire structure. A plurality of cross chains 3 are connected to the side chains 1 and 2 and to each other intermediate their ends. The cross chains 3 extend transversely of each other forming substantially diamond shape transversely extending portions in the chain structure and also providing cross chain portions at the tread of the tire which engage the surface over which the chain is traveling and prevent both lateral and circumferential skidding of the vehicle wheel upon which the chain is mounted.

A novel form of connecting link is provided to securely connect the meeting ends of the side chains 1 and 2 and these links are preferably formed of resilient metal, having eyes 4 formed integrally thereon at one end of the links which eyes are adapted to receive therethrough the ends of the end links at one end of each of said chains 1 and 2. The side lengths 5 and 6 of the connecting links 7 are free from connection at their ends remote from the eyes 4 and are adapted to be spread as shown in Fig. 3 of the drawing, to permit their engagement through the end links at the opposite ends of the side chains after which they are forced inwardly towards each other to cause their curve free ends 8 to lie in overlapping engagement to securely connect the ends of the chains. The improved connecting link structure 7 may be employed for connecting the ends of the cross chains 3 to the side chains 1 and 2.

It is, of course, to be understood that the invention may be constructed in various other manners and the parts associated in different relations and therefore, I do not desire to be limited in any manner except as set forth in the claim hereunto appended.

Having thus described my invention what I claim is:

A chain connecting link having a continuous non-yieldable circular eye portion, and side sections extending from the eye portions from diametrical points and at a slight incline to each other, each of said sections having its end portions formed into a hook. and said hooks extending towards each other to be arranged in overlapping relation when the sections are bent towards each other.

In testimony whereof I affix my signature.

FRANK ANDRASKA.